United States Patent [19]

Mercando et al.

[11] Patent Number: 5,859,079
[45] Date of Patent: Jan. 12, 1999

[54] POLYURETHANE CATALYST COMPOSITIONS FOR IMPROVING FOAM PERFORMANCE

[75] Inventors: Lisa Ann Mercando, Pennsburg; Michael John Kimock, Kutztown; Michael Louie, Bethlehem; Mark Leo Listemann, Kutztown, all of Pa.

[73] Assignee: Air Products and Chemicals, Inc., Allentown, Pa.

[21] Appl. No.: 861,138

[22] Filed: May 21, 1997

[51] Int. Cl.$^6$ .................................................. C08J 9/04
[52] U.S. Cl. ........................ 521/129; 521/128; 521/155; 521/170
[58] Field of Search .................................. 521/128, 129, 521/155, 170

[56] References Cited

U.S. PATENT DOCUMENTS

| | | |
|---|---|---|
| 4,007,140 | 2/1977 | Ibbotson . |
| 4,094,827 | 6/1978 | McEntire . |
| 4,194,069 | 3/1980 | Speranza et al. . |
| 4,310,632 | 1/1982 | Horacek et al. ........................ 521/129 |
| 4,330,656 | 5/1982 | Grogler et al. . |
| 4,644,017 | 2/1987 | Haas et al. . |
| 5,057,480 | 10/1991 | Petrella ................................... 521/129 |

FOREIGN PATENT DOCUMENTS 3027796  2/1982  Germany .

*Primary Examiner*—John M. Cooney, Jr.
*Attorney, Agent, or Firm*—Michael Leach

[57] ABSTRACT

A polyurethane catalyst composition comprises N,N'-bis(3-dimethylaminopropyl) urea and 3-dimethylaminopropyl urea in a ratio that can be varied to systematically control flowability, airflow, and force-to-crush physical properties for flexible polyurethane foam to enhance processibility. Increasing the N,N'-bis(3-dimethylaminopropyl) urea to 3-dimethylaminopropyl urea ratio increases the airflow and decreases the force-to-crush values of the foam whereas decreasing the N,N'-bis(3-dimethylaminopropyl) urea to 3-dimethylaminopropyl urea ratio improves the flowability of the foam.

16 Claims, No Drawings

POLYURETHANE CATALYST COMPOSITIONS FOR IMPROVING FOAM PERFORMANCE

BACKGROUND OF THE INVENTION

The present invention relates to tertiary amine catalysts for producing polyurethane foam.

Polyurethane foams are widely known and used in automotive, housing and other industries. Such foams are produced by reaction of a polyisocyanate with a polyol in the presence of various additives. One such additive is a chlorofluorocarbon (CFC) blowing agent which vaporizes as a result of the reaction exotherm, causing the polymerizing mass to form a foam. The discovery that CFCs deplete ozone in the stratosphere has resulted in mandates diminishing CFC use. Production of water-blown foams, in which blowing is performed with CO2 generated by the reaction of water with the polyisocyanate, has therefore become increasingly important. Tertiary amine catalysts are typically used to accelerate blowing (reaction of water with isocyanate to generate CO2) and gelling (reaction of polyol with isocyanate).

The ability of the tertiary amine catalyst to selectively promote either blowing or gelling is an important consideration in selecting a catalyst for the production of a particular polyurethane foam. If a catalyst promotes the blowing reaction to a too high degree, much of the CO2 will be evolved before sufficient reaction of isocyanate with polyol has occurred, and the CO2 will bubble out of the formulation, resulting in collapse of the foam. A foam of poor quality will be produced. In contrast, if a catalyst too strongly promotes the gelling reaction, a substantial portion of the CO2 will be evolved after a significant degree of polymerization has occurred. Again, a poor quality foam, this time characterized by high density, broken or poorly defined cells, or other undesirable features, will be produced.

Tertiary amine catalysts generally are malodorous and offensive and many have high volatility due to their low molecular weight. Release of tertiary amines during foam processing may present significant safety and toxicity problems, and release of residual amines from consumer products is generally undesirable.

Amine catalysts which contain urea functionality (e.g., RNHCONHR') have an increase in molecular weight and hydrogen bonding and reduced volatility and odor when compared to related structures which lack this functionality. Furthermore, catalysts which contain urea functionality chemically bond into the urethane during the reaction and are not released from the finished product. Catalyst structures which embody this concept are typically of low to moderate activity and promote both the blowing (water-isocyanate) and the gelling (polyol-isocyanate) reactions to varying extents.

U.S. Pat. No. 4,644,017 discloses the use of certain diffusion stable amino alkyl ureas having tertiary amino groups in the production of a polyisocyanate addition product which do not discolor or change the constitution of surrounding materials. Specifically taught are Catalyst A and Catalyst D which are reaction products of dimethylaminopropylamine and urea.

U.S. Pat. No. 4,007,140 discloses the use of N,N'-bis(3-dimethylaminopropyl)urea as a low odor catalyst for the manufacture of polyurethanes.

U.S. Pat. No. 4,194,069 discloses the use of N-(3-dimethylaminopropyl)-N'-(3-morpholino-propyl)urea, N,N'-bis(3-dimethylaminopropyl)urea and N,N'-bis(3-morpholinopropyl)urea as catalysts for producing polyurethane foams.

U.S. Pat. No. 4,094,827 discloses the use of certain alkyl substituted ureas including N,N-bis(3-dimethylaminopropyl)urea which provide lower odor and a delay in the foaming reaction that aids in the production of polyurethane foam.

U.S. Pat. No. 4,330,656 discloses the use of N-alkyl ureas as catalysts for the reaction of 1,5-napthylene diisocyanate with polyols or for the chain extension of prepolymers based upon 1,5-napthylene diisocyanate without accelerating atmospheric oxidation.

DE 30 27 796 A1 discloses the use of higher molecular weight dialkyl aminoalkyl ureas as reduced odor catalysts for the production of polyurethane foam.

SUMMARY OF THE INVENTION

The present invention provides a catalyst composition for making flexible polyurethane foam. The catalyst composition comprises 3-dimethylaminopropyl urea and N,N'-bis(3-dimethylaminopropyl) urea, i.e., the mono-and bis-ureas of 3-dimethyl-aminopropylamine, respectively. Using these catalyst compositions, which comprise a mixture of the mono and bis alkyl substituted ureas in amounts from>0 to<100 mole % mono-urea and>0 to<100 mole % bis-urea improves the physical properties of the polyurethane foam.

The ratio of the two urea compounds can be varied to systematically control flowability, airflow, and force-to-crush physical properties for flexible foams to enhance processibility. Increasing the N,N'-bis(3-dimethylaminopropyl) urea to 3-dimethyl-aminopropyl urea ratio increases the airflow and decreases the force-to-crush values of the foam while decreasing the N,N'-bis(3-dimethylaminopropyl) urea to 3-dimethyl-aminopropyl urea ratio improves the flowability of the foaming composition. An additional advantage of these catalysts is that they contain a ureido group which will react with isocyanate and chemically bond into the urethane during the reaction; therefore, the catalyst is not released from the finished foam product.

DETAILED DESCRIPTION OF THE INVENTION

The catalyst compositions according to the invention catalyze the reaction between an isocyanate functionality and an active hydrogen-containing compound, i.e. an alcohol, a polyol, an amine or water, especially the urethane (gelling) reaction of polyol hydroxyls with isocyanate to make polyurethanes and the blowing reaction of water with isocyanate to release carbon dioxide for making foamed polyurethanes.

The flexible polyurethane foam products, slab and molded, are prepared using any suitable organic polyisocyanates well known in the art including, for example, hexamethylene diisocyanate, phenylene diisocyanate, toluene diisocyanate ("TDI") and 4,4'-diphenylmethane diisocyanate ("MDI"). Especially suitable are the 2,4- and 2,6-TDI's individually or together as their commercially available mixtures. Other suitable isocyanates are mixtures of diisocyanates known commercially as "crude MDI", marketed as PAPI by Dow Chemical, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanate and a polyether or polyester polyol.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a trio in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

Other typical agents found in the polyurethane foam formulations include chain extenders such as ethylene glycol and butanediol; crosslinkers such as diethanolamine, diisopropanolamine, triethanolamine and tripropanolamine; blowing agents such as water, CFCs, HCFCs, HFCs, pentane, and the like; and cell stabilizers such as silicones.

A general polyurethane flexible foam formulation having a 1–3 lb/ft$^3$ (16–48 kg/m$^3$) density (e.g., automotive seating) containing a catalyst such as the catalyst composition according to the invention would comprise the following components in parts by weight (pbw):

| Flexible Foam Formulation | pbw |
| --- | --- |
| Polyol | 20–100 |
| Polymer Polyol | 50–0 |
| Silicone Surfactant | 1–2.5 |
| Blowing Agent | 2–4.5 |
| Crosslinker | 0.5–2 |
| Catalyst | 0.5–2 |
| Isocyanate Index | 70–115 |

The reactive catalyst compositions comprise the compounds represented by the following formulas I and II in any mole % ratio, preferably 50 to 95 mole % mono-urea (I), for controlling process latitude in a cost effective manner. The mole % is based on moles of mono-urea (I) and bis-urea (II). In order to improve the flowability of the foaming composition, the catalyst composition should contain 80 to 95 mole % mono-urea (I) and 5 to 20 mole % bis-urea (II). To increase airflow and decrease the force-to-crush values of the flexible foam the catalyst composition should be 5 to 20 mole % mono-urea (I) and 80 to 95 mole % bis-urea (II). In addition, as a result of the preparation procedure the catalyst composition may contain up to 20 wt % unreacted urea (III), based on the weight of compounds (I) and (II).

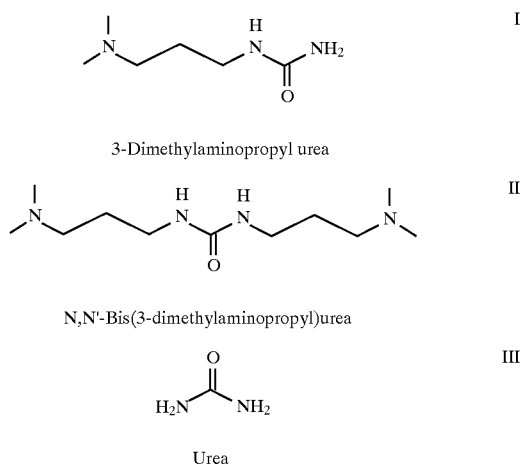

Compounds I and II are prepared by reacting urea and N,N-dimethylamino-propylamine in the appropriate molar ratios under an inert atmosphere at elevated temperatures. Compounds I and II can be isolated individually by chromatographic techniques known in the synthesis art.

A catalytically effective amount of the catalyst composition is used in the polyurethane formulation. More specifically, suitable amounts of the catalyst composition may range from about 0.01 to 10 parts by wt per 100 parts polyol (pphp) in the polyurethane formulation, preferably 0.05 to 1 pphp.

The catalyst composition may be used in combination with, or also comprise, other tertiary amine, organotin or carboxylate urethane catalysts well known in the urethane art.

EXAMPLE 1

Synthesis of 3-Dimethylaminopropyl Urea (I)

A 94:6 mole ratio blend of 3-dimethylaminopropyl urea (I) and N,N'-bis(3-dimethylaminopropyl) urea (II) catalyst mixture was prepared using a one liter 3 neck round bottom flask fitted with the following: mechanical stirrer, reflux condenser, nitrogen bubbler, and a temperature controlled heating mantle. The flask was charged with 176.3 g of urea [CH$_4$N$_2$O] and 300.0 g of N,N-dimethylaminopropylamine [(CH$_3$)$_2$NCH$_2$CH$_2$CH$_2$NH$_2$]. The mixture was stirred at a constant rate while being slowly heated to 120° C. The reaction was controlled at 120° C. until all signs of NH$_3$ evolution had ceased (as evidenced by bubbling in the N$_2$ pressure relief device). The pale yellow liquid was cooled to 80° C. and the flask containing the liquid was evacuated via vacuum pump and refilled with N$_2$ three times to remove any volatiles still present. Quantitative $^{13}$C NMR showed the final product to be 86 mole % 3-dimethylaminopropyl urea (I), 5 mole % N,N'-bis(3-dimethylaminopropyl) urea (II), and 9 mole % unreacted urea. The mono to bis mole ratio is 17.2 to 1, or 94:6 ratio of mono urea to bis urea.

EXAMPLE 2

Synthesis of N,N'-Bis(3-Dimethylaminopropyl) Urea (II)

A one liter 3 neck round bottom flask was fitted with the following: mechanical stirrer, reflux condenser, nitrogen bubbler, and a temperature controlled heating mantle. The flask was charged with 83.96 g of urea [$CH_4N_2O$] and 300 g of N,N-dimethylamino-propylamine [$(CH_3)_2NCH_2CH_2CH_2NH_2$]. The mixture was stirred at a constant rate while being slowly heated to 120° C. The reaction was controlled at 120° C. for 1.5 hours and then the reaction temperature was increased to 140° C., 160° C. and finally 180° C. The temperature was increased each time after ammonia evolution stopped. Excess N,N-dimethylaminopropylamine was removed via distillation. Quantitative $^{13}C$ NMR showed the product to be 98 mole % N,N'-bis(3-dimethylaminopropyl) urea (II) and 2 mole % 3-dimethylaminopropyl urea (I).

EXAMPLE 3

Synthesis of 53:47 Mole Ratio Blend of 3-Dimethylaminopropyl Urea (I) and N,N'-Bis(3-Dimethylaminopropyl) Urea (II)

A blend of 21.6 g of Example 1 catalyst and 15.9 g of Example 2 catalyst produced a mixture which contained 51 mole % I and 44 mole % II and 5 mole % unreacted urea.

EXAMPLE 4

A polyurethane flexible foam was prepared in a conventional manner in a 12"×12"×3" (30.5×30.5×7.6 cm) heated test block mold at 160° F. (71° C.). The polyurethane formulation in parts by weight was:

| COMPONENT | pbw |
| --- | --- |
| E-648 | 60 |
| E-519 | 40 |
| DC-5043 | 0.6 |
| DC-5169 | 0.2 |
| Diethanolamine | 1.49 |
| Water | 3.5 |
| TDI 80 | 105 Index |

E-648—a conventional, ethylene oxide tipped polyether polyol from Arco Chemical Co.
E-519—a styrene-acrylonitrile copolymer filled polyether polyol from Arco Chemical Co.
DABCO® DC-5043—silicone surfactant marketed by Air Products and Chemicals, Inc.
DABCO® DC-5169—silicone surfactant marketed by Air Products and Chemicals, Inc.
TDI 80—a mixture of 80 wt % 2,4-TDI and 20 wt % 2,6-TDI Table I lists the physical properties obtained using the catalysts from Examples 1–3. The foam tested met standard specifications listed in ASTM D 3453-91 and the tests were performed using ASTM designation D 3574-95. The force-to-crush results were obtained using a mechanical device equipped with a 1000 pound (454 kg) capacity pressure transducer mounted between the 50 square inch (323 $cm^2$) circular plate and the drive shaft. The Dayton motor specifications, model 4Z528, include ⅙ horsepower (124 J/S) with F/L rpm of 1800 and F/L torque of 5.63 in-lb (6.36×$10^4$ Nm). The actual pressure is shown on a digital display. The pad is compressed to 50% of its original thickness and the force necessary to achieve the compression is recorded. A cycle takes 24 seconds to complete and the actual crushing of the foam occurs within 7–8 seconds. This device mimics the ASTM D-3574, Indentation Force Deflection Test, and provides a numerical value for 1 minute post demolded foam initial hardness or softness.

TABLE I

| | Example 1 Catalyst | Example 2 Catalyst | Example 3 Catalyst |
| --- | --- | --- | --- |
| Mono/Bis Ratio | 94:6 | 2.98 | 53:47 |
| pphp[a] | 1.17 | 1.17 | 1.17 |
| Density (lb/$ft^3$; kg/$m^3$) | 1.95; 31.2 | 1.91; 30.6 | 1.9; 30.4 |
| Airflow (SCFM; L/min) | 3.3; 93.4 | 3.71; 105.1 | 3.62; 102.5 |
| Force-to-Crush[b] (lbf; N) | 108; 479 | 65; 289 | 97; 431 |
| 25% ILD (lbf; N) | 23; 102 | 22; 98 | 23; 102 |
| 65% ILD (lbf; N) | 61; 271 | 62; 275 | 62; 275 |
| 25% R ILD (lbf; N) | 19; 84 | 18; 80 | 19; 84 |
| Ball Rebound (%) | 51 | 55 | 52 |
| 50% Comp. Set (%) | 26 | 33 | 31 |
| 50% H.A. Comp. Set (%) | 39 | 40 | 39 |
| Japanese Wet Set (%) | 34 | 36 | 32 |

[a]Catalyst mixtures are diluted to 75 wt % in dipropylene glycol
[b]Lower force-to-crush values mean the foam is more easily compressed Example 4 demonstrates that increasing levels of N,N'-bis(3-dimethylamino-propyl) urea (II) increased airflow and decreased force-to-crush physical properties of flexible foam. This improves processing latitude and decreases shrinkage of the foam.

EXAMPLE 5

A polyurethane foam was prepared in a conventional manner using the same formulation as listed in Example 4. The catalyst (Table II) was added to 202 g of the premix in a 32 oz (951 ml) paper cup and the formulation was mixed for 20 seconds at 5000 RPM using an overhead stirrer fitted with a 2 in (5.1 cm) diameter stirring paddle. Sufficient TDI 80 was added to make a 105 index foam [index=(mole NCO/mole active hydrogen)×100] and the formulation was mixed well for 5 seconds using the same overhead stirrer. The 32 oz (951 ml) cup was dropped through a hole in the bottom of a 128 oz (3804 ml) paper cup placed on a stand. The hole was sized to catch the lip of the 32 oz (951 ml) cup. The total volume of the foam container was 160 oz (4755 ml). Foams approximated this volume at the end of the foam forming process. The force-to-crush data in Table II were obtained using a heated test block mold at 160° F. (71° C.) and crushing the foam 1 minute post demold.

TABLE II

| Catalyst | pphp | TOC 1 (s) | TOC 2 (s) | String Gel (s) | Full Rise (s) | Force-to-Crush (lbf; N) |
| --- | --- | --- | --- | --- | --- | --- |
| Ex 1 | 1.17 | 14.0 | 44.7 | 74.2 | 166.1 | 109; 484 |
| Ex 2 | 1.17 | 12.4 | 40.7 | 77.1 | 153.0 | 65; 289 |
| Ex 2 | 1.29 | 11.7 | 38.9 | 72.8 | 139.8 | 73; 324 |

Times cited were from mixing of the polyol with isocyanate. Top of Cup 1 (TOC 1) represents the time required for the foam formulation to fill a 32 oz (951 ml) cup and is an indication of reaction initiation. Top of Cup 2 (TOC 2) represents the time required for the foam formulation to fill a 128 oz (3.8 L) bucket in addition to the 32 oz (951 ml) Cup mentioned above and is an indication of reaction progression. String Gel and Full Rise are further measures of reaction progression and provide some indication of extent of cure. In Example 5, catalyst use levels were chosen to match string gel times. The string gel times of Example 2 catalyst (II) at the different use levels bracketed the string gel time of Example 1 (I) catalyst and are within experimental error of Example 1 (I) catalyst string gel times. The data in Table 2 indicates that Example 1 catalyst (I) provided an initial delay in reaction initiation (longer TOC 1) while providing cure within the same time as Example 2 catalyst (II). This initial delay allows for greater flowability of the foam and improves processing latitude.

U.S. Pat. No. 4,644,017 Table 3 indicates that Catalyst A and Catalyst D provided equivalent performance for PVC foil backed semi-rigid foam. Therefore, one skilled in the art would expect no performance improvements in flexible foam by using mixtures of catalysts (I) and (II). Unexpectedly, mixtures of catalysts (I) and (II) do provide performance improvements in flexible foam. U.S. Pat. No. 4,007,140 example 6 demonstrated that N,N'-bis(3-dimethylaminopropyl) urea (II) produced foam of higher resiliency than the control. Furthermore, U.S. Pat. No. 4,194,069 indicates that N,N'-bis(3-dimethylamino-propyl) urea (II) produced slight foam shrinkage and course cells compared to N-(3-dimethylaminopropyl)-N'-(3-morpholinopropyl)urea. Thus, one would not be motivated to add (II) to lower the force-to-crush values. The advantage is that catalyst ratios may be used to systematically control flowability, airflow, and force-to-crush, therefore providing greater processing latitude in flexible foam.

STATEMENT OF INDUSTRIAL APPLICATION

The invention provides catalyst compositions for making flexible polyurethane foam.

We claim:

1. In a method for preparing a flexible polyurethane foam by reacting an organic polyisocyanate and a polyol in the presence of a blowing agent, a cell stabilizer and a catalyst composition, the improvement for controlling the processing latitude of the foam composition which comprises using a catalyst composition consisting essentially of>0 to<100 mole % 3-dimethylaminopropyl urea and>0 to<100 mole % N,N'-bis(3-dimethyl-aminopropyl) urea.

2. The method of claim 1 in which the catalyst composition comprises 50 to 95 mole % 3-dimethylaminopropyl urea and 5 to 50 mole % N,N'-bis(3-dimethylaminopropyl) urea.

3. The method of claim 1 for improving the flowability of the flexible polyurethane foam which comprises using a catalyst composition comprising 80 to 95 mole % 3-dimethylaminopropyl urea and 5 to 20 mole % N,N'-bis(3-dimethylaminopropyl) urea.

4. The method of claim 1 for improving the airflow and decreasing the force to crush of the flexible polyurethane foam which comprises using a catalyst composition comprising 5 to 20 mole % 3-dimethylaminopropyl urea and 80 to 95 mole % N,N'-bis(3-dimethylaminopropyl) urea.

5. The method of claim 1 in which the catalyst composition is used in combination with other tertiary amine, organotin, or carboxylate urethane catalysts.

6. The method of claim 2 in which the catalyst composition is used in combination with other tertiary amine, organotin, or carboxylate urethane catalysts.

7. The method of claim 3 in which the catalyst composition is used in combination with other tertiary amine, organotin, or carboxylate urethane catalysts.

8. The method of claim 4 in which the catalyst composition is used in combination with other tertiary amine, organotin, or carboxylate urethane catalysts.

9. In a polyurethane flexible foam composition having a 1–3 lb/ft$^3$ (16–48 kg/m$^3$) density and comprising the following components in parts by weight (pbw):

| | |
|---|---|
| Polyol | 20–100 |
| Polymer Polyol | 80–0 |
| Silicone Surfactant | 1–2.5 |
| Blowing Agent | 2–4.5 |
| Crosslinker | 0.5–2 |
| Catalyst Composition | 0.5–2 |
| Isocyanate Index | 70–115 | the improvement which comprises the catalyst composition comprising>0 to<100 mole % 3-dimethylaminopropyl urea and>0 to<100 mole % N,N'-bis(3-dimethylamino-propyl) urea.

10. The flexible foam composition of claim 9 in which the catalyst composition comprises 50 to 95 mole % 3-dimethylaminopropyl urea and 5 to 50 mole % N,N'-bis(3-dimethylaminopropyl) urea.

11. The flexible foam composition of claim 9 in which the catalyst composition comprises 80 to 95 mole % 3-dimethylaminopropyl urea and 5 to 20 mole % N,N'-bis(3-dimethylaminopropyl) urea.

12. The flexible foam composition of claim 9 in which the catalyst composition comprises 5 to 20 mole % 3-dimethylaminopropyl urea and 80 to 95 mole % N,N'-bis(3-dimethylaminopropyl) urea.

13. The flexible foam composition of claim 9 in which the catalyst composition is in combination with other tertiary amine, organotin, or carboxylate urethane catalysts.

14. The flexible foam composition of claim 10 in which the catalyst composition is in combination with other tertiary amine, organotin, or carboxylate urethane catalysts.

15. The flexible foam composition of claim 11 in which the catalyst composition is in combination with other tertiary amine, organotin, or carboxylate urethane catalysts.

16. The flexible foam composition of claim 12 in which the catalyst composition is in combination with other tertiary amine, organotin, or carboxylate urethane catalysts.

* * * * *